May 24, 1960 M. E. CHANDLER 2,937,706
SELF-PROPELLED CARTS
Filed Sept. 25, 1953
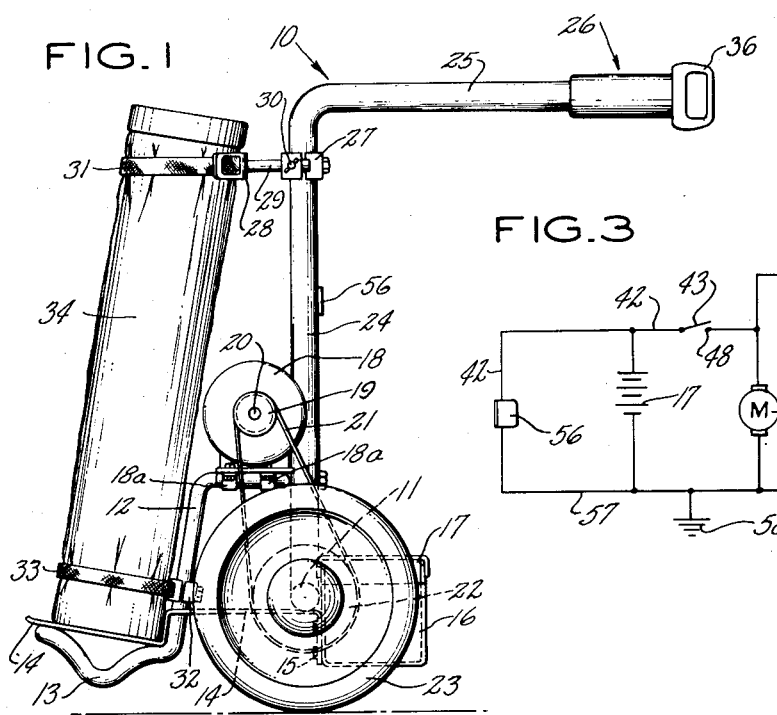

United States Patent Office 2,937,706
Patented May 24, 1960

2,937,706

SELF-PROPELLED CARTS

Milton E. Chandler, 30 Woodland Lane,
Kensington, Conn.

Filed Sept. 25, 1953, Ser. No. 382,421

4 Claims. (Cl. 180—19)

This invention relates to a novel construction of an electrically driven cart, and particularly to the novel control of said cart, whereby with a minimum effort on the part of the operator it can be made to operate at any desired speed.

It is particularly suitable for the use of a golfer in transporting the golf bag and clubs; and the control means is so designed that by grasping the cart handle and exerting a slight tractive effort by walking away, the electric motor will start and drive the cart at whatever speed is necessary to keep the tractive effort exerted by the operator to a minimum.

The essential components, the golf bag and clubs, the motor and the battery, are so arranged in relation to the cart axle as to be in practical balance and thus require little effort on the part of the operator to raise the bag carrier stop from the ground and to propel the vehicle by a slight pull on the handle as he walks.

This type of control mechanism for the electric motor is adaptable to any cart that is guided and directed by an operator who is walking, and will travel at any speed necessary to keep the tractive effort exerted by the operator to the desired minimum.

Novel means are also shown for charging a group of carts simultaneously and consecutively with a minimum of effort and control on the part of the attendant.

Other objects and advantages of the invention will hereinafter become more fully apparent from the following description of the drawings which illustrate one embodiment of the invention.

Fig. 1 is a side elevation of a golf cart constructed in accordance with the invention.

Fig. 2 is a detailed sectional view of the handle control mechanism.

Fig. 3 is a schematic wiring diagram of the battery, motor, control mechanism, and charging plug.

Fig. 4 is a schematic drawing illustrating how a group of carts may be charged for a given period of time, and then automatically another group may be charged, and then other groups, etc., without the attention of the attendant except for initially plugging in the carts.

Referring more particularly to the drawings, wherein like reference characters designate like or corresponding parts throughout the different views.

In Fig. 1, 10 designates generally a golf cart of the two-wheeled type; 11 the axle; 23 the wheels, which are keyed to the axle 11; 22 the large pulley which is attached to one of the wheels. The main frame, 24, is supported by the axle 11; attached to the main frame 24 is bag supporting frame 12 with stop or rest 13. Likewise attached to the frame is bag supporting bottom plate and bracket 14. Attached to bracket 14 is battery supporting bracket 16 by means of bolts 15. 17 indicates the battery, not shown, supported by bracket 16 to one side of the axle.

34 is the golf bag, golf clubs not shown, and 33 and 31 are straps for attaching the bag to the frame; strap 33 is attached to clamp 32 on frame support 12; strap 31 is attached to bracket 28, which is attached to rod 29, slidable in bracket 27; 30 is a wing nut to clamp rod 29 to bracket 27 in position desired to properly balance the weight of bag and clubs (not shown) with the weight of the motor and battery.

18 is the electric motor attached to frame support 12 by motor supporting brackets 18a, which are slidable on frame 12 to properly tension the belt 21. 19 is the small pulley attached to the armature shaft 20 of motor 18.

25 is a horizontal shaft extension of main frame 24 and attached thereto is handle 36 and control 26.

Attached to main frame 24 is also charging plug 56.

In Fig. 2, the shaft 25 extends from the main frame 24 in a substantially horizontal direction. Attached to shaft 25 is a control and handle support 51, having a bore extending through the center thereof, in which are located ball bearings 52, held in place by plate 53 and screws 54. Extending through the ball bearings in 51 is a sleeve shaft 37, to one end of which is attached handle 36, and to the other end, flange 38. Between the flange 38 and support 51 is compression spring 55.

35 is the outer housing of the control attached to handle 36.

On the outer diameter of 51 is insulation 50, and wound on the insulation is resistor wire 47 which is connected to control contact 48; attached to the inner diameter of outer housing 35 in an insulated manner is resilient switch member 43; attached to switch member 43 is insulated wire 42 which leads to one terminal of battery 17 as shown in Fig. 3. Wire 49 is connected to contact member 48 and the armature of motor 18, the other armature being grounded. Resistor contact 45 is attached in an insulated manner to the inner diameter of 35 and is connected by wire 41 to the shunt field coil 46 of motor 18. Wires 42 and 41 are secured to housing 35 by clamps 44 and extend through the holes 40 in the circumference of shaft 37 and through inner hole 39 to the battery terminal and shunt field coil 46 of the motor.

Charging plug 56, attached to frame 24, is connected as shown in Fig. 3 by wire 57 to one terminal of the battery 17 and to ground 58.

The battery load is on one side of the axle and is balanced by the weight of the motor and the weight of the golf bag and clubs on the other side. The top bag support is adjustable in and out by rod 29 and clamp 30 to shift the center of gravity of the bag and clubs to give the desired balance. If it is desired to carry more than one bag or an unusually heavy load, the motor may be located on the same side of the axle as the battery.

At rest the cart is supported by stop 13 and the two wheels, the golf bag being substantially vertical and the frame extension 25 slightly above horizontal. By exerting a downward thrust on handle 36 the stop is raised off the ground and then by exerting a slight pull on 36, spring 38 compresses slightly, allowing switch member 43 to be moved into contact with 48 completing the circuit from battery through the armature and field of motor 18. This causes the motor to start and propel the vehicle in the direction guided by the operator. If the first contact gives insufficient power to propel the vehicle at the speed desired, a slight additional pull will cause resistor contact 45 to move further to the right to weaken the field and cause the motor to run at a faster speed to propel the cart. The faster the operator walks, the more spring 38 is compressed and the field is further weakened to increase the speed of the motor. The cart is therefore propelled at any speed necessary to keep the tractive effort of the operator to a minimum by the adjustment of the resistor to weaken the field strength of the shunt wound motor. Normally the cart follows the operator but in going down hill the cart may precede the operator and the motor will then exert a braking effect.

The energy of the battery is sufficient to propel the cart for several hours but the batteries should be recharged every night when in use. Fig. 4 schematically illustrates a means for doing this with minimum effort on the part of the attendants.

59 is a source of A.C. current. 60 is a rectifier to convert the A.C. to the proper D.C. current for charging purposes. 61 is a wire leading to clock timer switch 62, to which is attached a multiplicity of takeoff leads 63, connected to charging plugs 64. A group of carts may be attached to each plug 64. The clock timer switch 62 has a pivoted arm 62a which is adapted to selectively contact any one of the leads 63 and thereby cause one of said leads to be connected to the rectifier for a selected number of hours and then automatically switch to another take-off lead and another group of carts, etc. In this way a multiplicity of carts may be charged during the night without the attention of the attendant.

I claim:

1. A cart constructed and arranged to be guided by a pedestrian operator, comprising: motor means for propelling said cart, control means, responsive to the operator's guiding pull on said cart, and means responsive to said control means for automatically regulating the propulsive power of said motor means, in accordance with the magnitude of said pull, so as to reduce said pull to a minimum; said cart having a guiding shaft and said control means comprising an operator's handle, slidably mounted on said shaft and in such operative relation to said means for regulating the propulsive power of said motor that said power varies in response to the movement of said handle by the pull of said operator; said motor means comprising an electric motor and a battery for supplying current to said motor, and said regulating means comprising means for varying said current in accordance with said movement of said handle; said cart having a plurality of wheels and a frame with a load-carrying means adjustably attached thereto, said frame being mounted upon a rotatable axle attached to said wheels; said cart also having adjustable means for mounting said motor and battery on gravimetric opposite sides of said axle on said frame, and means for adjusting the position of said load-carrying means in such relation to the position of said motor and battery, that when said load-carrying means is loaded and suitably adjusted with reference to said axle, the cart is substantially balanced gravimetrically about said axle.

2. A cart according to claim 1, wherein said frame is provided with a stop means, so constructed and arranged that, when the cart is stationary and said stop means contacts the ground, said stop means maintains said frame in a substantially vertical position.

3. A cart according to claim 2, wherein said load-carrying means is a golf club bag.

4. A cart according to claim 2, wherein said axle and said motor are each provided with an attached pulley connected by an endless belt and said adjustable mounting means permits said motor to be positioned so as to suitably tension said belt.

References Cited in the file of this patent

UNITED STATES PATENTS

| | | |
|---|---|---|
| D. 151,008 | Rycraft | Sept. 14, 1948 |
| 387,714 | Fiske | Aug. 14, 1888 |
| 857,797 | Euker | June 25, 1907 |
| 858,658 | Kennedy | July 2, 1907 |
| 1,235,973 | Heid | Aug. 7, 1917 |
| 1,267,742 | Bulley | May 28, 1918 |
| 1,389,871 | Hersh | Sept. 6, 1921 |
| 1,534,026 | Burne | Apr. 21, 1925 |
| 2,138,239 | Irgens | Nov. 29, 1938 |
| 2,405,674 | Schliwa et al. | Aug. 13, 1946 |
| 2,417,613 | Radabaugh | Mar. 18, 1947 |
| 2,482,203 | Peterson et al. | Sept. 20, 1949 |
| 2,572,109 | Coates | Oct. 23, 1951 |
| 2,575,327 | Ashley et al. | Nov. 20, 1951 |
| 2,588,664 | Schreck | Mar. 11, 1952 |
| 2,597,735 | Jepson | May 20, 1952 |
| 2,626,652 | Steigler | Jan. 27, 1953 |
| 2,645,297 | Wennberg et al. | July 14, 1953 |